US012494893B2

(12) United States Patent
Medles et al.

(10) Patent No.: US 12,494,893 B2
(45) Date of Patent: Dec. 9, 2025

(54) ENHANCED SUPPORT FOR TRANSMIT-RECEIVE TRANSITION GAP IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Francesc Boixadera-Espax, Cambridge (GB); Gilles Charbit, Cambridge (GB); I-Kang Fu, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 300 days.

(21) Appl. No.: 18/030,769

(22) PCT Filed: Oct. 8, 2021

(86) PCT No.: PCT/CN2021/122582
§ 371 (c)(1),
(2) Date: Apr. 6, 2023

(87) PCT Pub. No.: WO2022/073474
PCT Pub. Date: Apr. 14, 2022

(65) Prior Publication Data
US 2023/0379131 A1     Nov. 23, 2023

Related U.S. Application Data

(60) Provisional application No. 63/087,933, filed on Oct. 6, 2020.

(51) Int. Cl.
*H04W 4/00*     (2018.01)
*H04L 5/00*     (2006.01)
(Continued)

(52) U.S. Cl.
CPC .............. *H04L 5/16* (2013.01); *H04L 5/0048* (2013.01); *H04W 72/0446* (2013.01)

(58) Field of Classification Search
CPC ....... H04L 5/16; H04L 5/0048; H04L 5/0053; H04W 72/0446; H04W 72/231; H04W 72/23
See application file for complete search history.

(56) References Cited

U.S. PATENT DOCUMENTS

2011/0051633 A1\* 3/2011 Pan ................... H04W 56/0045
370/336
2018/0124724 A1     5/2018 Tsai et al.
(Continued)

FOREIGN PATENT DOCUMENTS

CN      101572577 A     11/2009
CN      108024387 A      5/2018
(Continued)

OTHER PUBLICATIONS

Chinan National Intellectual Property Administration, First Office Action in China Application No. 202180068213.6, Sep. 27, 2025.
(Continued)

*Primary Examiner* — Abdelnabi O Musa
(74) *Attorney, Agent, or Firm* — Andy M. Han; Han IP PLLC (57)     ABSTRACT

Solutions pertaining to enhanced support for transmit-receive (Tx-Rx) gap in non-terrestrial network (NTN) communications are proposed. An apparatus implemented in a UE receives from a non-terrestrial (NT) network node of a network an uplink (UL) grant or a configuration that schedules an UL transmission (Tx). The apparatus performs the UL transmission to the NT network node within a transmit-receive (Tx-Rx) transition gap during which no downlink (DL) Tx from the NT network node is expected. The Tx-Rx transition gap includes an UL Tx duration, a pre-UL Tx gap
(Continued)

(Gap_start) before a starting time of the UL Tx duration (t_start), and a post-UL Tx gap (Gap_end) after an ending time of the UL Tx duration (t_end). A starting timing of the Tx-Rx transition gap can be expressed as: t_start−timing advance (TA)−Gap_start. An ending time of the Tx-Rx transition gap can be expressed as: t_end−TA+Gap_end.

18 Claims, 6 Drawing Sheets

(51) Int. Cl.
    *H04L 5/16*         (2006.01)
    *H04W 72/0446*   (2023.01)

(56) References Cited

U.S. PATENT DOCUMENTS

| | | | |
|---|---|---|---|
| 2020/0314896 A1* | 10/2020 | Koorapaty | H04W 16/14 |
| 2021/0337539 A1* | 10/2021 | Lei | H04W 72/23 |
| 2022/0086780 A1* | 3/2022 | Tsai | G01S 19/05 |
| 2023/0074775 A1* | 3/2023 | Lei | H04W 74/0838 |
| 2023/0362857 A1* | 11/2023 | Ghanbarinejad | H04W 56/0045 |
| 2024/0014979 A1* | 1/2024 | Lei | H04L 5/16 |

FOREIGN PATENT DOCUMENTS

| | | |
|---|---|---|
| CN | 109219966 A | 1/2019 |
| CN | 110178319 A | 8/2019 |
| CN | 110611949 A | 12/2019 |

OTHER PUBLICATIONS

Moderator (Ericsson): "Feature lead summary on timing relationship enhancements", 3GPP TSG-RAN WG1, Meeting #102-e, R1-200xxxx, Aug. 25, 2020.

* cited by examiner

ENHANCED SUPPORT FOR TRANSMIT-RECEIVE TRANSITION GAP IN NON-TERRESTRIAL NETWORK COMMUNICATIONS

CROSS REFERENCE TO RELATED PATENT APPLICATION

The present disclosure is part of U.S. National Stage filing of International Patent Application No. PCT/CN2021/122582, filed 8 Oct. 2021, which is part of a non-provisional application claiming the priority benefit of U.S. Provisional Patent Application No. 63/087,933, filed 6 Oct. 2020, the content of which being incorporated by reference in its entirety.

TECHNICAL FIELD

The present disclosure is generally related to mobile communications and, more particularly, to enhanced support for transmit-receive (Tx-Rx) transition gap in non-terrestrial network (NTN) communications.

BACKGROUND

Unless otherwise indicated herein, approaches described in this section are not prior art to the claims listed below and are not admitted as prior art by inclusion in this section.

In wireless communications such as mobile communications according to the 3rd Generation Partnership Project (3GPP) specifications, timing advance (TA) typically refers to the length of time it takes for a signal to reach a base station from a user equipment (UE). Hence, in NTN communications, TA can be quite large. The value of TA can be either estimated by a base station as part of an initial access procedure or reported by the UE to the base station. In any case, the base station might not know the TA completely. For frequency-division-duplexing (FDD)-half-duplex systems and time-division-duplexing (TDD), downlink (DL) and uplink (UL) scheduling by the base station could collide at the UE unless the base station is aware of the TA used by the UE. As such, mechanisms currently defined in the 3GPP specification for half-duplex (HD)-FDD and TDD UE on which symbols, slots and/or subframes are used for UE transitioning between DL and UL transmissions need to be enhanced in order to support a large TA in NTN systems. Therefore, there is a need for a solution to provide enhanced support for Tx-Rx transition gap in NTN communications.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to enhanced support for Tx-Rx transition gap in NTN communications.

In one aspect, a method may involve a UE performing an UL transmission to a non-terrestrial (NT) network node of a network within a Tx-Rx transition gap during which no DL transmission from the NT network node is expected. The Tx-Rx transition gap may include an UL Tx duration, a pre-UL Tx gap before a starting time of the UL Tx duration, and a post-UL Tx gap after an ending time of the UL Tx duration.

In another aspect, a method may involve a UE obtaining an initial value of a TA. The method may also involve the UE receiving from an NTN an indication of a TA drift rate or function. In an event that the initial value of the TA is network-determined, the TA drift rate or function may be either specific to the UE or common to a beam or cell with which the UE is associated. In an event that the initial value of the TA is UE-determined, the TA drift rate or function may be common to the beam or cell with which the UE is associated.

It is noteworthy that, although description provided herein may be in the context of certain radio access technologies, networks and network topologies such as and NTN, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhanced support for Tx-Rx transition gap in NTN communications. According to the present disclosure, a number of possible solutions may be implemented separately or jointly. That is, although these possible solutions may be described below separately, two or more of these possible solutions may be implemented in one combination or another.

Figure 1:
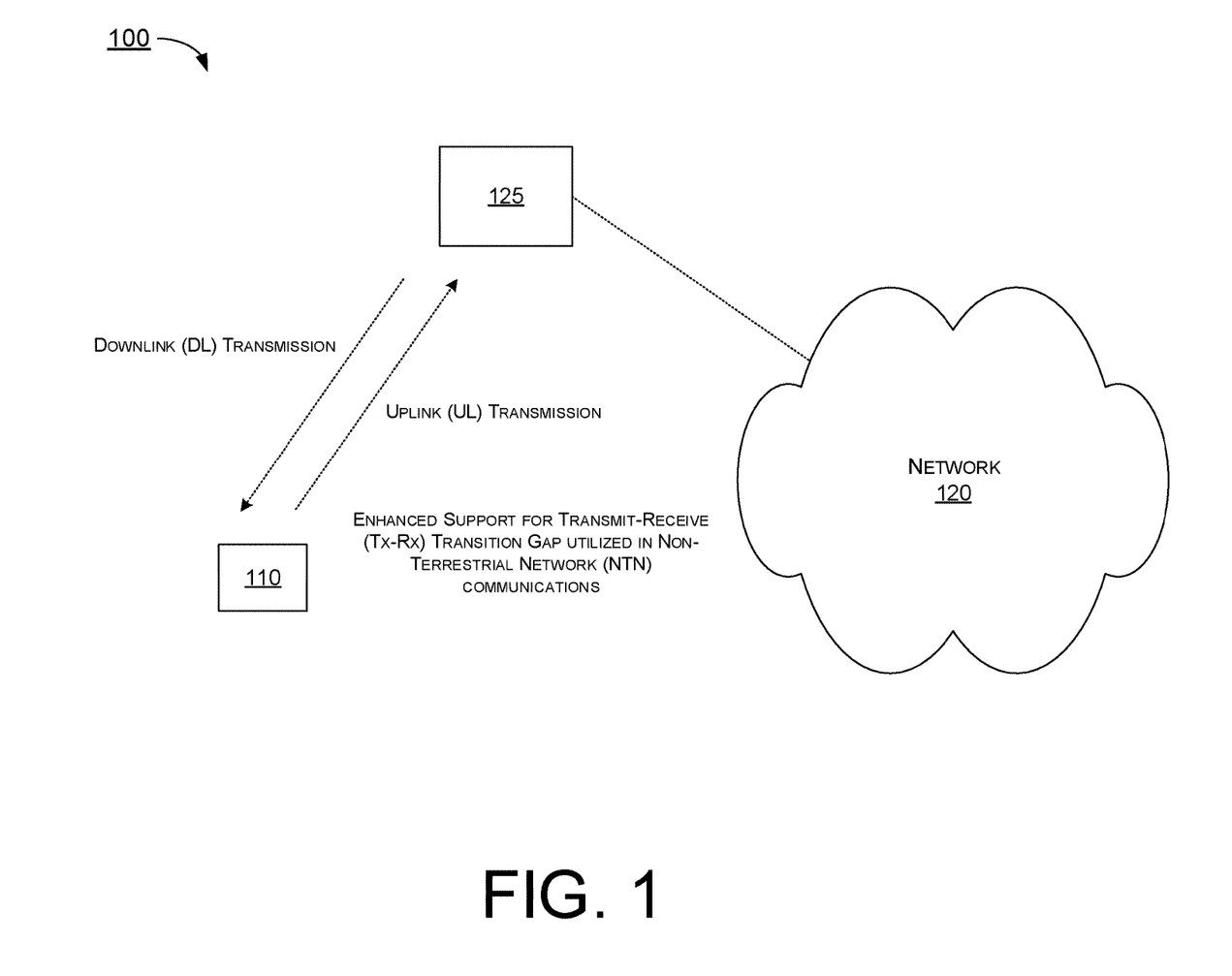
FIG. 1 is a diagram of an example network environment in which various proposed schemes in accordance with the present disclosure may be implemented.

FIG. 1 illustrates an example network environment 100 in which various proposed schemes in accordance with the present disclosure may be implemented. Network environment 100 may involve a UE 110 and a wireless network 120 (e.g., an LTE network, a 5G network, an NR network, an IoT network, an NB-IoT network, an IIoT network and/or an NTN network). UE 110 may communicate with wireless network 120 via a network node 125. In some cases, network node 125 may be an NT network node (e.g., a satellite) of an NTN. In some cases, network node 125 may be a terrestrial network node (e.g., a base station such as a gNB, eNB or transmission/reception point (TRP)). Each of UE 110 and network node 125 may be configured to perform operations pertaining to enhanced support for Tx-Rx transition gap in NTN communications under various proposed schemes in accordance with the present disclosure, as described below.

Figure 2:
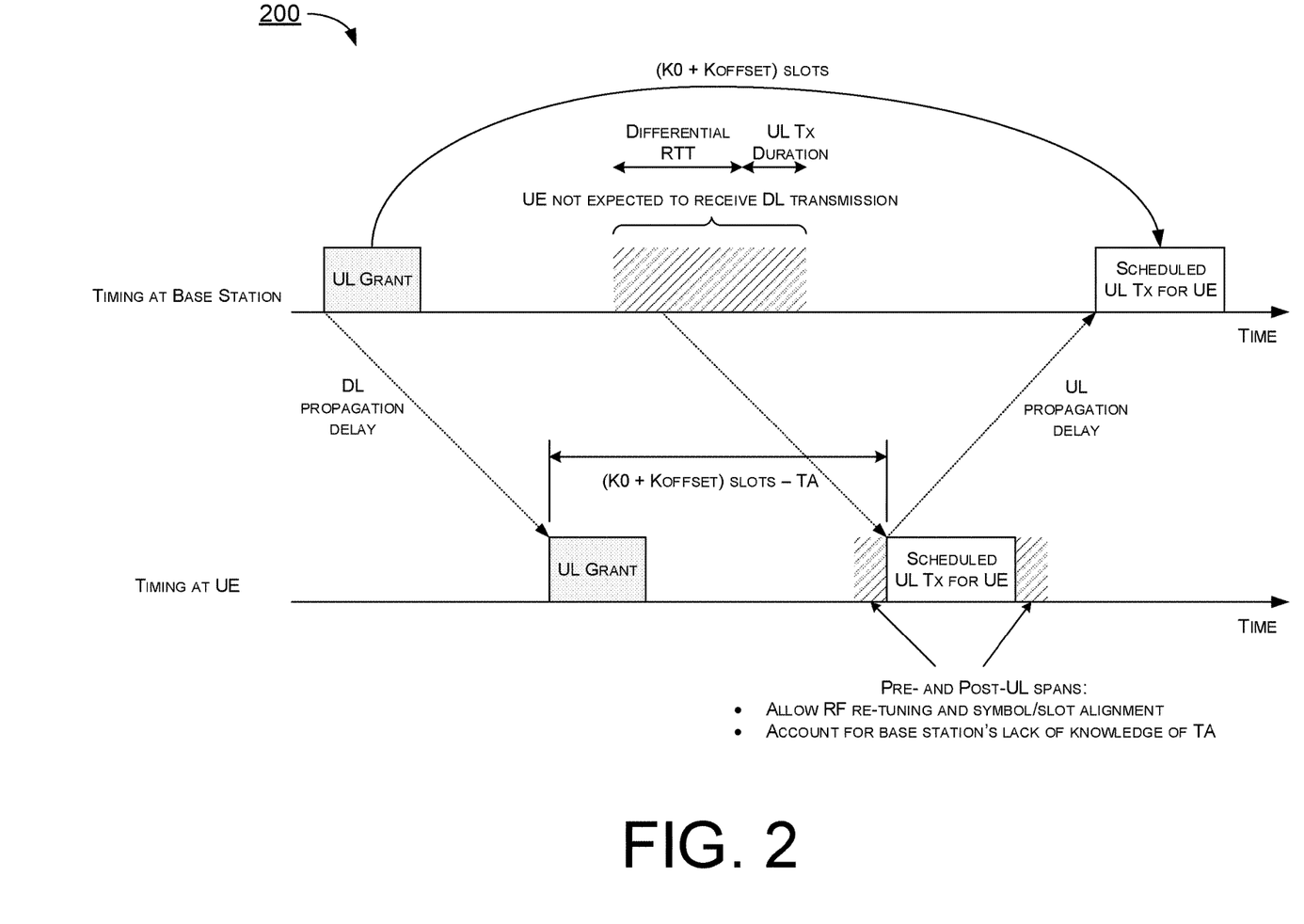
FIG. 2 is a diagram of an example scenario under a proposed scheme in accordance with the present disclosure.
Figure 3:
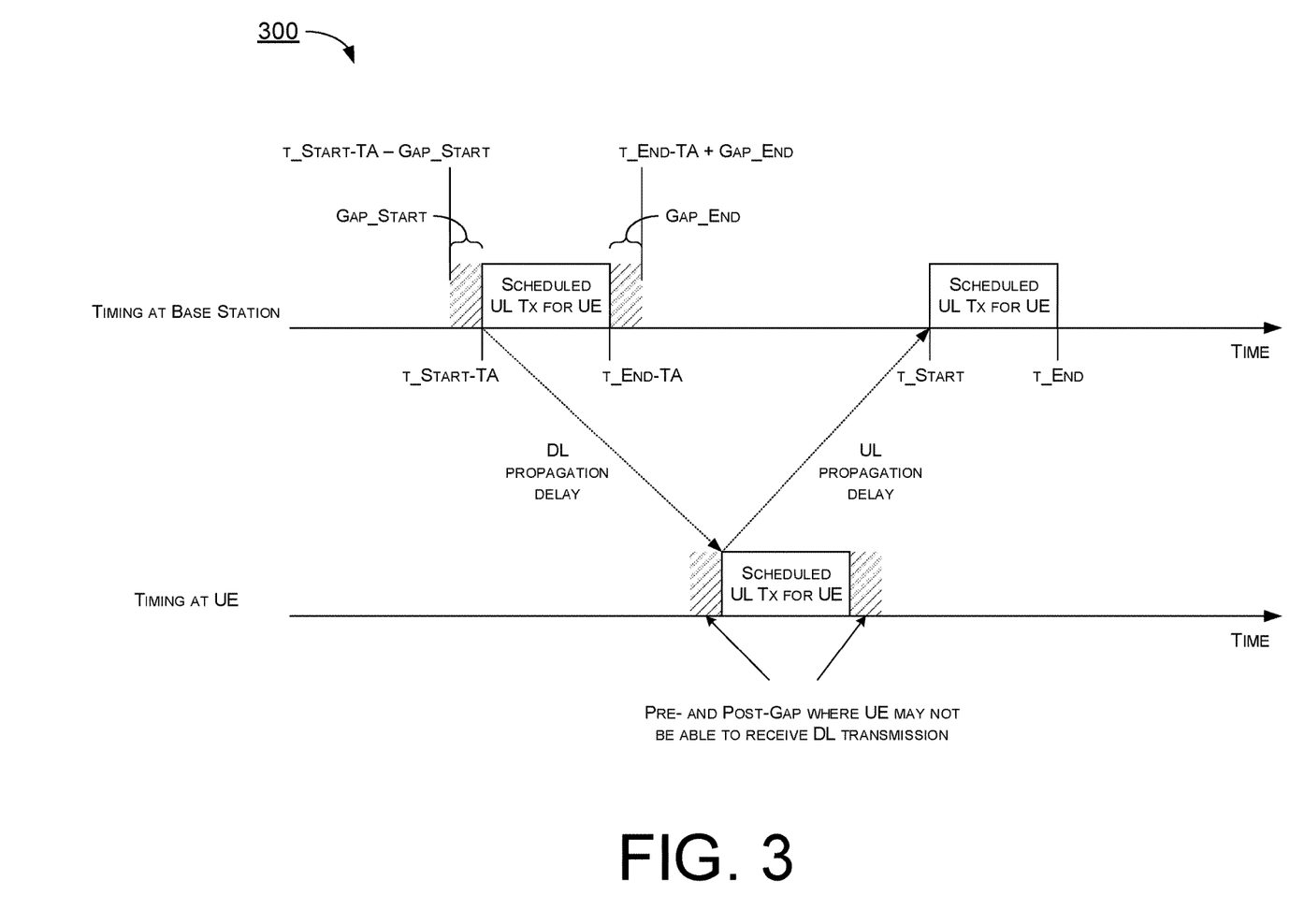
FIG. 3 is a diagram of an example scenario under a proposed scheme in accordance with the present disclosure.

Under a first proposed scheme in accordance with the present disclosure, a guard period as a Tx-Rx transition gap may be utilized around the start and end of a UL transmission. FIG. 2 illustrates an example scenario 200 under the proposed scheme, and FIG. 3 illustrates an example scenario 300 under the proposed scheme. Referring to FIG. 2 and FIG. 3, the start and end of a UL transmission may correspond to a scheduled starting time t_start–TA and a scheduled ending time t_end–TA, respectively. Due to timing drift, a first TA applied by UE 110 at the start of the UL transmission may potentially be different from a second TA applied by UE 110 at the end of the UL transmission. As shown in FIG. 2, from the perspective of the base station (e.g., network node 125), the time of a UL transmission by UE 110 may be after the time of an UL grant by a first duration (e.g., K0+Koffset slots), as a DL propagation delay and an UL propagation delay are taken into consideration. From the perspective of UE 110, the time of the UL transmission may be after the actual time of receipt of the UL grant by a second number of slots (e.g., K0+Koffset slots–TA). As shown in FIG. 2, there is a duration of the Tx-Rx transition gap during which any DL transmission by the base station is not expected to be received by UE 110. This duration of time may account for a differential roundtrip time (RTT) plus an UL transmission duration.

Under the proposed scheme, a pre-UL Tx gap (Gap_start) and a post-UL Tx gap (Gap_end) of a guard period may be defined such that any DL transmission is not expected to be received by UE 110 (and hence should not be performed by the base station) during the time duration of the Tx-Rx transition gap from t_start–TA–Gap_start until t_end–TA+Gap_end (as shown in FIG. 2 and FIG. 3) especially since UE 110 is likely to perform an UL transmission during that Tx-Rx transition gap (e.g., as a result of receiving the UL grant from network node 125). Advantageously, the use of a guard period to provide pre- and post-UL spans may allow radio frequency (RF) re-turning and alignment of symbols/slots. Moreover, the use of the guard period as pre- and post-UL spans may account for the lack of knowledge of the actual TA on the part of the base station.

Under the proposed scheme, the values of Gap_start and Gap_end may be the same or different. Moreover, t_start–TA–Gap_start may be rounded down to the start of a first symbol, slot or subframe of the UL transmission. Similarly, t_end–TA+Gap_end may be rounded up to the end of a last symbol, slot or subframe of the UL transmission.

Under the proposed scheme, the use of a guard period around the start and end of a UL transmission may be applied to a HD-FDD mode, a TDD mode or both. In such cases, the values of Gap_start and Gap_end may be the same or different for the HD-FDD mode or the TDD mode.

Under the proposed scheme, the values of Gap_start and Gap_end may be defined in the 3GPP specification regarding NTN. Alternatively, the values of Gap_start and Gap_end may be signaled to UE 110 by wireless network 120.

Under the proposed scheme, the values of Gap_start and Gap_end may be dependent on the band, frequency range or subcarrier spacing. For instance, in NR, Frequency Range 1 (FR1) and Frequency Range 2 (FR2) may have different values of Gap_start and Gap_end, respectively.

Under the proposed scheme, the values of Gap_start and Gap_end may be dependent on UE category or UE capability. For instance, depending on the category or capability, the values of Gap_start and Gap_end used by a first UE may be different than the values of Gap_start and Gap_end used by a second UE in an event that the first and second UEs are of different categories or capabilities.

Under the proposed scheme, the values of Gap_start and Gap_end may be dependent on a synchronization method and TA reporting setting. For instance, with respect to synchronization method, synchronization between UE 110 and wireless network 120 (or Network node 125) may be based on Global Navigation Satellite System (GNSS) capability or may be based on network-driven determination of the TA. As such, the values of Gap_start and Gap_end may be different between those synchronization methods. With respect to TA reporting setting, UE 110 may report its TA to network node 125 based on a trigger (e.g., by UE 110 itself or by network node 125) or based on a hysteresis value. As such, the values of Gap_start and Gap_end may be different between those TA reporting settings.

Under a second proposed scheme in accordance with the present disclosure, a TA drift rate may be reported by a network to a UE as the actual value of TA may change from the time the TA is either estimated by a base station and indicated to the UE or reported by the UE to the base station. In a first case in which the base station is the one determining the TA, the base station may indicate to the UE how the TA may change or drift over time (e.g., TA drift rate). This indication may be UE-specific since the base station may be in communication with multiple UEs and the respective TA drift rate for each UE may be different. Alternatively, the TA drift rate may be beam- or cell-based and thus common to all UEs within coverage of a beam or cell. For the first case, the UE (e.g., UE 110) may continuously update its TA based on the signaled initial TA and the TA drift rate (which may be in the form of a TA drift function). For instance, UE 110 may interpret or otherwise determine an updated position of the guard period or Tx-Rx transition gap in time based on its own updated TA (e.g., t_start−TA_updated−Gap_start and t_end−TA_updated+Gap_end may be based on the UE's updated TA).

In a second case in which the UE is the one determining the TA and reporting it to the base station, the base station may indicate to the UE the value of the TA drift rate that is used by the base station to update its estimate of the TA. In such a case the TA drift rate may be deemed as a beam- or cell-based TA drift rate. For the second case, the UE (e.g., UE 110) may be able to determine two quantities, namely TA_used and TA_updated. The value of TA_used may be based on the UE-calculated TA which is used for UL synchronization and that may be based on the UE position and satellite position or another method. The value of TA_updated may be based on the TA report that the UE has provided to the base station and which is updated with the TA drift rate (or TA drift function). For instance, UE 110 may calculate the difference, TA_diff, between TA_used and TA_updated as TA_diff=TA_used−TA_updated. UE 110 may determine to trigger a TA report based on TA_diff crossing a threshold Thrd (e.g., trigger may occur when abs(TA_diff)>Thrd). The value of the threshold Thrd may be set by the base station or fixed in the 3GPP specification. Moreover, UE 110 may interpret the position of Tx-Rx transition gaps based on its own updated TA (e.g., t_start−TA_updated−Gap_start and t_end−TA_updated+Gap_end). Alternatively, UE 110 may interpret the position of Tx-Rx transition gaps based on its own used TA including the value of Thrd (e.g., t_start−TA_used−Thrd−Gap_start and t_end−TA_used+Thrd+Gap_end). It is noteworthy that alternative formulations may as well be used to account for any mismatch between the TA used at the UE and the TA assumed by the base station.

Illustrative Implementations

Figure 4:
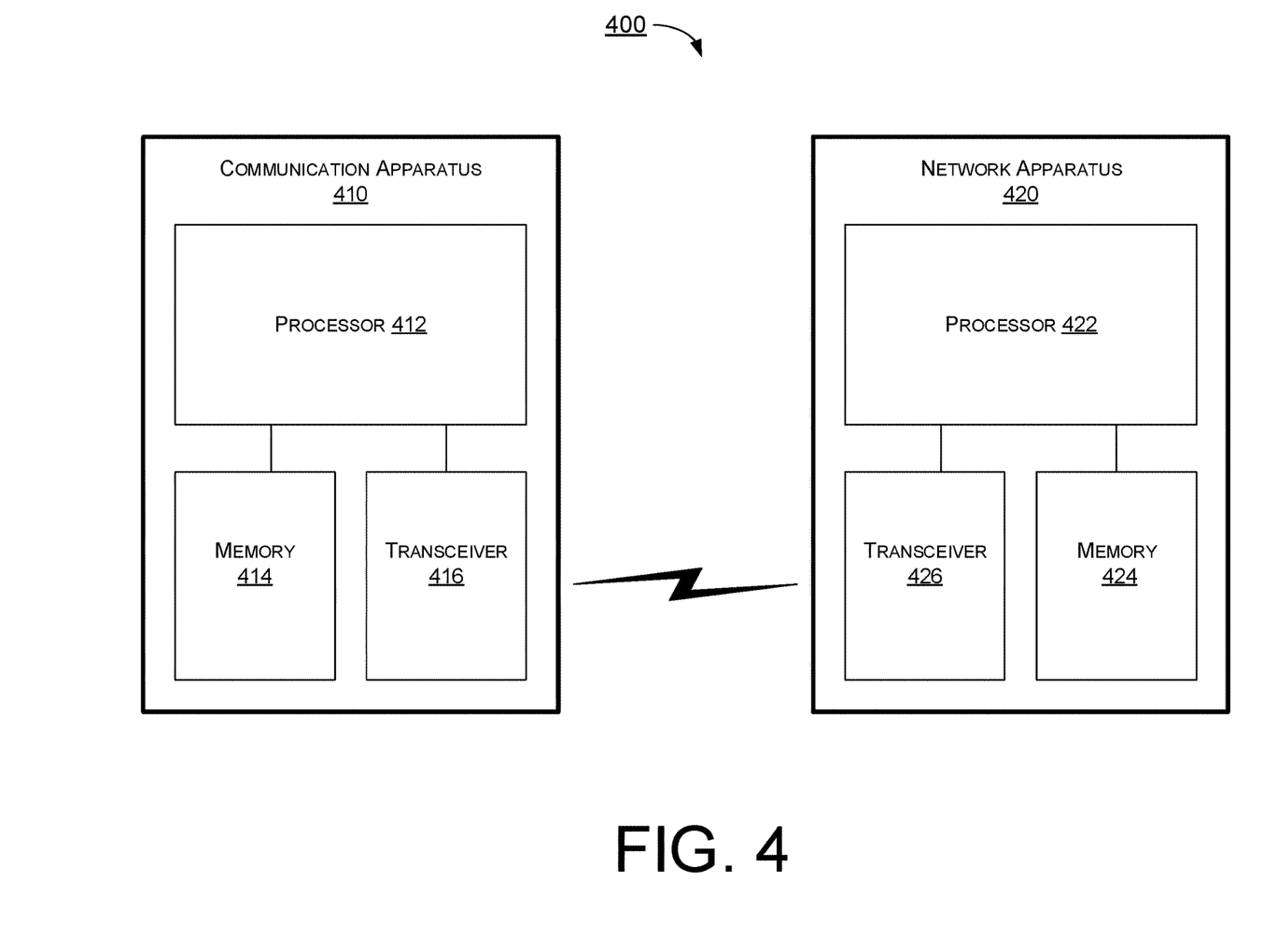
FIG. 4 is a block diagram of an example communication system in accordance with an implementation of the present disclosure.

FIG. 4 illustrates an example communication system 400 having an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to enhanced support for Tx-Rx transition gap in NTN communications, including scenarios/schemes described above as well as process(es) described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus/station, which may be a network node such as a base station, a small cell, a router, a gateway or a satellite. For instance, network apparatus 420 may be implemented in an eNodeB in an LTE, in a gNB in a 5G, NR, IoT, NB-IoT, IIoT, or in a satellite in an NTN network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, one or more RISC processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including enhanced support for Tx-Rx transition gap in NTN communications in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively.

Each of communication apparatus 410 and network apparatus 420 may be a communication entity capable of communicating with each other using various proposed schemes in accordance with the present disclosure. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE (e.g., UE 110) and network apparatus 420 is implemented in or as a network node or base station (e.g., network node 125) of a communication network (e.g., network 120). It is also noteworthy that, although the example implementations described below are provided in the context of WLAN, the same may be implemented in other types of networks.

Under some proposed schemes pertaining to enhanced support for Tx-Rx transition gap in NTN communications in accordance with the present disclosure, with communication apparatus 410 implemented in or as UE 110 and network apparatus 420 implemented in or as network node 125 in network environment 100, processor 412 may receive, via transceiver 416, from apparatus 420 as an NE network node (e.g., Network node 125) of a network (e.g., network 120) an UL grant or a configuration that schedules an UL Tx. Additionally, processor 412 may perform, via transceiver 416, the UL transmission to apparatus 420 within a Tx-Rx transition gap during which no DL Tx from apparatus 420 is expected.

In some implementations, the Tx-Rx transition gap may include an UL Tx duration, a pre-UL Tx gap (Gap_start) before a starting time of the UL Tx duration (t_start), and a post-UL Tx gap (Gap_end) after an ending time of the UL Tx duration (t_end). Moreover, from a perspective of apparatus 420, a starting timing of the Tx-Rx transition gap is expressed as t_start−timing advance (TA)−Gap_start. Furthermore, from the perspective of apparatus 420, an ending time of the Tx-Rx transition gap is expressed as t_end−TA+Gap_end.

In some implementations, the starting timing of the Tx-Rx transition gap may be rounded down to a start of a first symbol, slot or subframe of the UL Tx. Additionally, the ending time of the Tx-Rx transition gap may be rounded up to an end of a last symbol, slot or subframe of the UL Tx.

In some implementations, a value of the pre-UL Tx gap and a value of the post-UL Tx gap may be the same. Alternatively, the value of the pre-UL Tx gap and the value of the post-UL Tx gap may be different.

In some implementations, the UL grant may be received and the UL Tx may be performed with HD-FDD, TDD, or both. In such cases, a respective value of each of the Gap_start and Gap_end may either vary or remain fixed between a HD-FDD mode and a TDD mode.

In some implementations, a respective value of each of the Gap_start and Gap_end may be either fixed or signaled by the network.

In some implementations, a respective value of each of the Gap_start and Gap_end may depend on a band, frequency range, or subcarrier spacing.

In some implementations, a respective value of each of the Gap_start and Gap_end may depend on a category or capability of the UE.

In some implementations, a respective value of each of the Gap_start and Gap_end may depend on a synchronization method or a TA reporting setting.

In some implementations, processor 412 may perform additional operations. For instance, processor 412 may obtain an initial value of the TA (e.g., either by processor 412 determining the initial value of the TA or by receiving the initial value of the TA from apparatus 420 or another network node of the network). Additionally, processor 412 may receive, via transceiver 416, from the network an indication of a TA drift rate or function.

In some implementations, in an event that the initial value of the TA is network-determined, the TA drift rate or function may be either specific to the UE or common to a beam or cell with which the UE is associated. Moreover, in an event that the initial value of the TA is UE-determined, the TA drift rate or function may be common to the beam or cell with which the UE is associated.

In some implementations, responsive to the initial value of the TA being network-determined, processor 412 may perform additional operations. For instance, processor 412 may update the TA to provide an updated TA (TA_updated) based on the initial value of the TA and the TA drift rate or function. Furthermore, processor 412 may determine an updated position of the Tx-Rx transition gap in time based on the TA_updated.

In some implementations, responsive to the initial value of the TA being UE-determined, processor 412 may perform additional operations. For instance, processor 412 may transmit, via transceiver 416, to the network (e.g., via apparatus 420 or another network node) a TA report indicating a value of the TA determined by the UE. Additionally, processor 412 may calculate a used TA (TA_used), which is used in UL synchronization, based on a position of the UE and a position of the NT network node. Moreover, processor 412 may calculate an updated TA (TA_updated) based on the TA indicated in the TA report and the TA drift rate or function. Furthermore, processor 412 may calculate a differential TA (TA_diff) based on a difference between the TA_used and the TA_updated. Also, processor 412 may determine whether a magnitude of the TA_diff is greater than a threshold. Moreover, processor 412 may transmit, via transceiver 416, a TA report to the network responsive to the TA_diff being greater than the threshold.

In some implementations, processor 412 may perform additional operations. For instance, processor 412 may determine an updated position of the Tx-Rx transition gap in time based on either: (a) the TA_used and a threshold; or (b) the TA_updated.

Under some proposed schemes pertaining to enhanced support for Tx-Rx transition gap in NTN communications in accordance with the present disclosure, with communication apparatus 410 implemented in or as UE 110 and network apparatus 420 implemented in or as network node 125 in network environment 100, processor 412 may obtain an initial value of a TA. For instance, processor 412 may obtain the initial value of the TA either by determining the initial value of the TA itself or by receiving the initial value of the TA from apparatus 420 (as Network node 125) or another network node of a network (e.g., an NTN such as network 120). Moreover, processor 412 may receive, via transceiver 416, from the NTN an indication of a TA drift rate or function.

In some implementations, in an event that the initial value of the TA is network-determined, the TA drift rate or function may be either specific to the UE or common to a beam or cell with which the UE is associated. Moreover, in an event that the initial value of the TA is UE-determined, the TA drift rate or function may be common to the beam or cell with which the UE is associated.

In some implementations, responsive to the initial value of the TA being network-determined, processor 412 may perform additional operations. For instance, processor 412 may update the TA to provide an updated TA (TA_updated) based on the initial value of the TA and the TA drift rate or function. Moreover, processor 412 may determine an updated position of the Tx-Rx transition gap in time based on the TA_updated.

In some implementations, responsive to the initial value of the TA being UE-determined, processor 412 may perform additional operations. For instance, processor 412 may transmit, via transceiver 416, to the network a TA report indicating a value of the TA determined by the UE. Additionally, processor 412 may calculate a used TA (TA_used), which is used in UL synchronization, based on a position of the UE and a position of the NT network node. Moreover, processor 412 may calculate an updated TA (TA_updated) based on the TA indicated in the TA report and the TA drift rate or function. Furthermore, processor 412 may determine an updated position of the Tx-Rx transition gap in time based on either: (a) the TA_used and a threshold, or (b) the TA_updated.

In some implementations, processor 412 may perform additional operations. For instance, processor 412 may calculate a differential TA (TA_diff) based on a difference between the TA_used and the TA_updated. Moreover, processor 412 may determine whether a magnitude of the TA_diff is greater than the threshold. Furthermore, processor 412 may transmit, via transceiver 416, a TA report to the network responsive to the TA_diff being greater than the threshold.

Illustrative Processes

Figure 5:
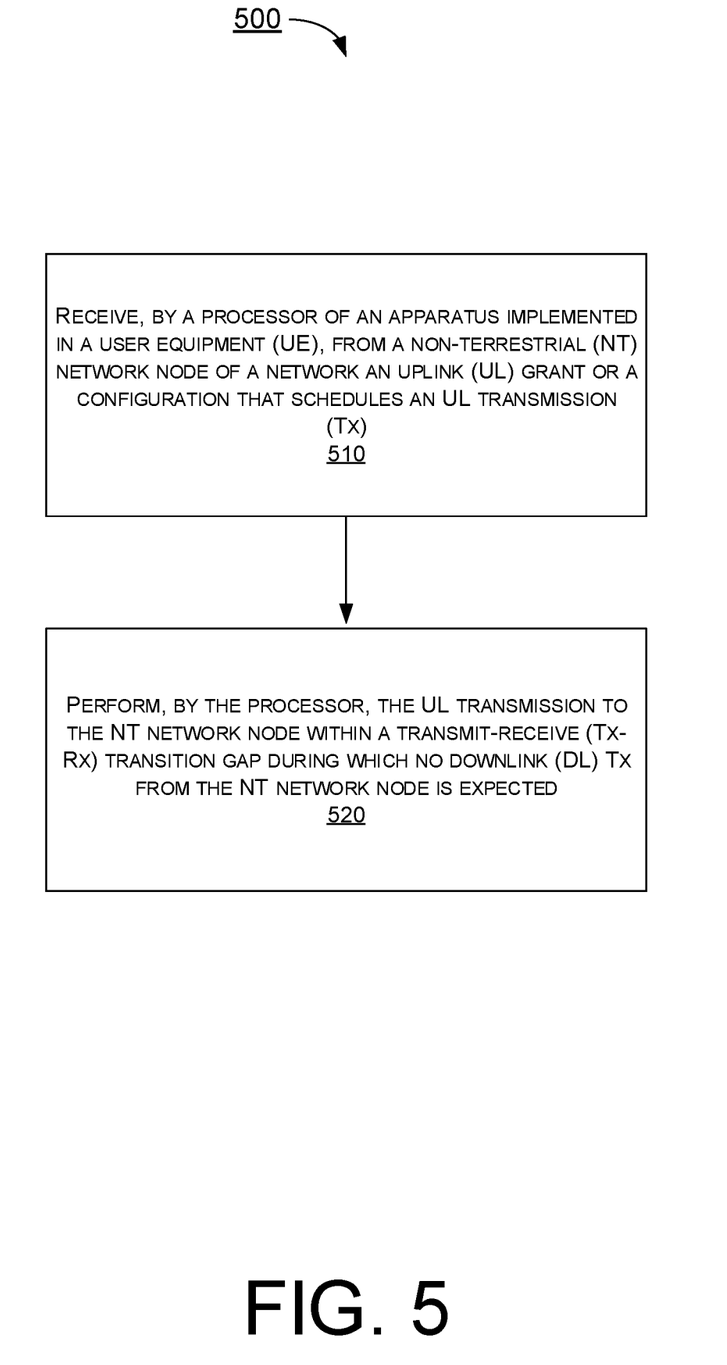
FIG. 5 is a flowchart of an example process in accordance with an implementation of the present disclosure.

FIG. 5 illustrates an example process 500 in accordance with an implementation of the present disclosure. Process 500 may be an example implementation of schemes described above whether partially or completely, with respect to enhanced support for Tx-Rx transition gap in NTN communications in accordance with the present disclosure. Process 500 may represent an aspect of implementation of features of communication apparatus 410 and/or network apparatus 420. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410 implemented in or as UE 110 and network apparatus 420 implemented in or as Network node 125. Process 500 may begin at block 510.

At 510, process 500 may involve processor 412 of apparatus 410 as UE 110 receiving, via transceiver 416, from apparatus 420 as an NE network node (e.g., Network node 125) of a network (e.g., network 120) an UL grant or a configuration that schedules an UL Tx. Process 500 may proceed from 510 to 520.

At 520, process 500 may involve processor 412 performing, via transceiver 416, the UL transmission to apparatus 420 within a Tx-Rx transition gap during which no DL Tx from apparatus 420 is expected.

In some implementations, the Tx-Rx transition gap may include an UL Tx duration, a pre-UL Tx gap (Gap_start) before a starting time of the UL Tx duration (t_start), and a post-UL Tx gap (Gap_end) after an ending time of the UL Tx duration (t_end). Moreover, from a perspective of apparatus 420, a starting timing of the Tx-Rx transition gap is expressed as t_start−timing advance (TA)−Gap_start. Furthermore, from the perspective of apparatus 420, an ending time of the Tx-Rx transition gap is expressed as t_end−TA+Gap_end.

In some implementations, the starting timing of the Tx-Rx transition gap may be rounded down to a start of a first symbol, slot or subframe of the UL Tx. Additionally, the ending time of the Tx-Rx transition gap may be rounded up to an end of a last symbol, slot or subframe of the UL Tx.

In some implementations, a value of the pre-UL Tx gap and a value of the post-UL Tx gap may be the same. Alternatively, the value of the pre-UL Tx gap and the value of the post-UL Tx gap may be different.

In some implementations, the UL grant may be received and the UL Tx may be performed with HD-FDD, TDD, or both. In such cases, a respective value of each of the Gap_start and Gap_end may either vary or remain fixed between a HD-FDD mode and a TDD mode.

In some implementations, a respective value of each of the Gap_start and Gap_end may be either fixed or signaled by the network.

In some implementations, a respective value of each of the Gap_start and Gap_end may depend on a band, frequency range, or subcarrier spacing.

In some implementations, a respective value of each of the Gap_start and Gap_end may depend on a category or capability of the UE.

In some implementations, a respective value of each of the Gap_start and Gap_end may depend on a synchronization method or a TA reporting setting.

In some implementations, process 500 may involve processor 412 performing additional operations. For instance, process 500 may involve processor 412 obtaining an initial value of the TA (e.g., either by processor 412 determining the initial value of the TA or by receiving the initial value of the TA from apparatus 420 or another network node of the network). Additionally, process 500 may involve processor 412 receiving, via transceiver 416, from the network an indication of a TA drift rate or function.

In some implementations, in an event that the initial value of the TA is network-determined, the TA drift rate or function may be either specific to the UE or common to a beam or cell with which the UE is associated. Moreover, in an event that the initial value of the TA is UE-determined, the TA drift rate or function may be common to the beam or cell with which the UE is associated.

In some implementations, responsive to the initial value of the TA being network-determined, process 500 may involve processor 412 performing additional operations. For instance, process 500 may involve processor 412 updating the TA to provide an updated TA (TA_updated) based on the initial value of the TA and the TA drift rate or function. Furthermore, process 500 may involve processor 412 determining an updated position of the Tx-Rx transition gap in time based on the TA_updated.

In some implementations, responsive to the initial value of the TA being UE-determined, process 500 may involve processor 412 performing additional operations. For instance, process 500 may involve processor 412 transmitting, via transceiver 416, to the network (e.g., via apparatus 420 or another network node) a TA report indicating a value of the TA determined by the UE. Additionally, process 500 may involve processor 412 calculating a used TA (TA_used), which is used in UL synchronization, based on a position of the UE and a position of the NT network node. Moreover, process 500 may involve processor 412 calculating an updated TA (TA_updated) based on the TA indicated in the TA report and the TA drift rate or function. Furthermore, process 500 may involve processor 412 calculating a differential TA (TA_diff) based on a difference between the TA_used and the TA_updated. Also, process 500 may involve processor 412 determining whether a magnitude of the TA_diff is greater than a threshold. Moreover, process 500 may involve processor 412 transmitting, via transceiver 416, a TA report to the network responsive to the TA_diff being greater than the threshold.

In some implementations, process 500 may involve processor 412 performing additional operations. For instance, process 500 may involve processor 412 determining an updated position of the Tx-Rx transition gap in time based on either: (a) the TA_used and a threshold; or (b) the TA_updated.

Figure 6:
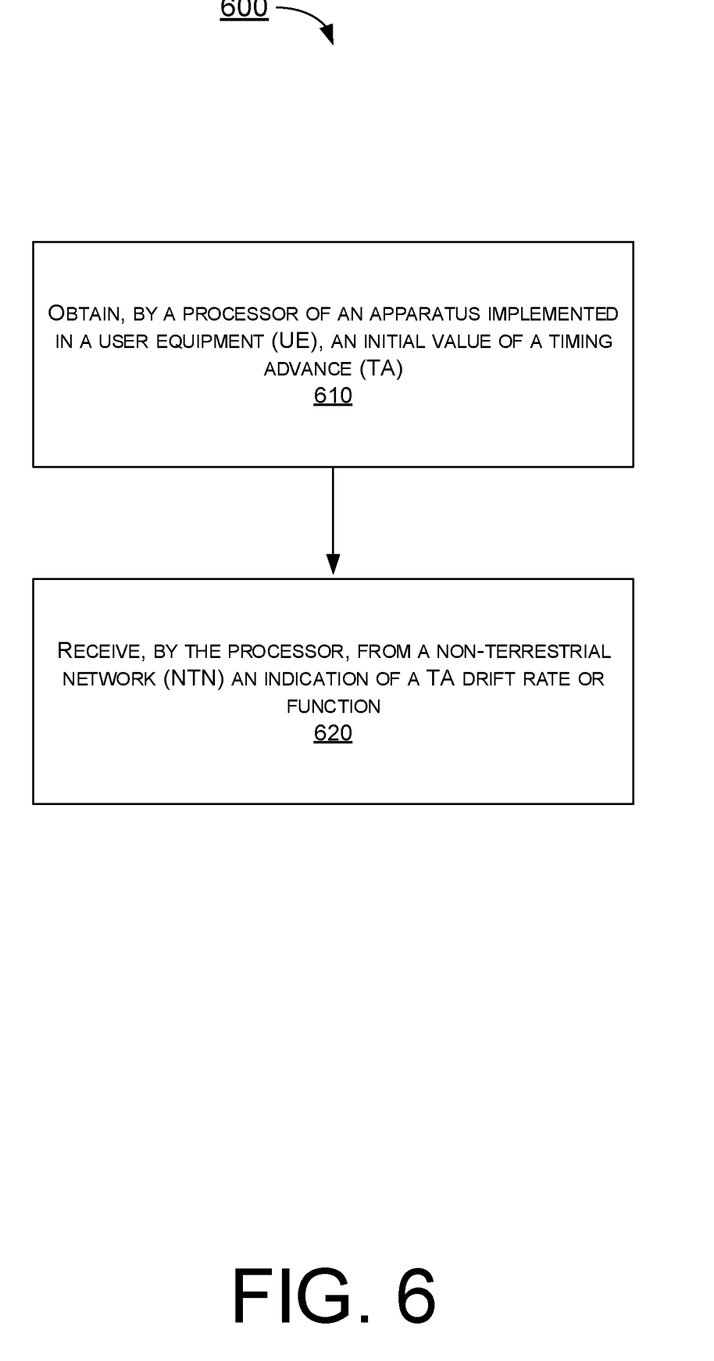
FIG. 6 is a flowchart of an example process in accordance with an implementation of the present disclosure.

FIG. 6 illustrates an example process 600 in accordance with an implementation of the present disclosure. Process 600 may be an example implementation of schemes described above whether partially or completely, with respect to enhanced support for Tx-Rx transition gap in NTN communications in accordance with the present disclosure. Process 600 may represent an aspect of implementation of features of communication apparatus 410 and/or network apparatus 420. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 410 or any suitable UE or machine type devices. Solely for illustrative purposes and without limitation, process 600 is described below in the context of communication apparatus 410 implemented in or as UE 110 and network apparatus 420 implemented in or as Network node 125. Process 600 may begin at block 610.

At 610, process 600 may involve processor 412 of apparatus 410 as UE 110 obtaining an initial value of a TA. For instance, processor 412 may obtain the initial value of the TA either by determining the initial value of the TA itself or by receiving the initial value of the TA from apparatus 420 (as Network node 125) or another network node of a network (e.g., an NTN such as network 120). Process 600 may proceed from 610 to 620.

At 620, process 600 may involve processor 412 receiving, via transceiver 416, from the NTN an indication of a TA drift rate or function.

In some implementations, in an event that the initial value of the TA is network-determined, the TA drift rate or function may be either specific to the UE or common to a beam or cell with which the UE is associated. Moreover, in an event that the initial value of the TA is UE-determined, the TA drift rate or function may be common to the beam or cell with which the UE is associated.

In some implementations, responsive to the initial value of the TA being network-determined, process 600 may involve processor 412 performing additional operations. For instance, process 600 may involve processor 412 updating the TA to provide an updated TA (TA_updated) based on the initial value of the TA and the TA drift rate or function. Moreover, process 600 may involve processor 412 determining an updated position of the Tx-Rx transition gap in time based on the TA_updated.

In some implementations, responsive to the initial value of the TA being UE-determined, process 600 may involve processor 412 performing additional operations. For instance, process 600 may involve processor 412 transmitting, via transceiver 416, to the network a TA report indicating a value of the TA determined by the UE. Additionally, process 600 may involve processor 412 calculating a used TA (TA_used), which is used in UL synchronization, based on a position of the UE and a position of the NT network node. Moreover, process 600 may involve processor 412 calculating an updated TA (TA_updated) based on the TA indicated in the TA report and the TA drift rate or function. Furthermore, process 600 may involve processor 412 determining an updated position of the Tx-Rx transition gap in time based on either: (a) the TA_used and a threshold, or (b) the TA_updated.

In some implementations, process 600 may involve processor 412 performing additional operations. For instance, process 600 may involve processor 412 calculating a differential TA (TA_diff) based on a difference between the TA_used and the TA_updated. Moreover, process 600 may involve processor 412 determining whether a magnitude of the TA_diff is greater than the threshold. Furthermore, process 600 may involve processor 412 transmitting, via transceiver 416, a TA report to the network responsive to the TA_diff being greater than the threshold.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
   performing, by a processor of an apparatus implemented in a user equipment (UE), an uplink (UL) transmission to a non-terrestrial (NT) network node of a network within a transmit-receive (Tx-Rx) transition gap during which no downlink (DL) transmission (Tx) from the NT network node is expected;
   obtaining, by the processor, an initial value of the TA;
   receiving, by the processor, from the network an indication of a TA drift rate or function; and
   receiving, by the processor, from the network a UL grant or a configuration that schedules the UL transmission Tx,
   wherein the performing of the UL transmission comprises performing the UL transmission responsive to receiving the UL grant or the configuration,
   wherein the Tx-Rx transition gap comprises an UL Tx duration, a pre-UL Tx gap (Gap_start) before a starting time of the UL Tx duration (t_start), and a post-UL Tx gap (Gap_end) after an ending time of the UL Tx duration (t_end), and
   wherein, from a perspective of the NT network node:
      a starting timing of the Tx-Rx transition gap is expressed as:

$t\_start - \text{timing advance (TA)} - Gap\_start$, and an ending time of the Tx-Rx transition gap is expressed as:

$t\_end - TA + Gap\_end$.

2. The method of claim 1, wherein the starting timing of the Tx-Rx transition gap is rounded down to a start of a first symbol, slot or subframe of the UL Tx, and wherein the ending time of the Tx-Rx transition gap is rounded up to an end of a last symbol, slot or subframe of the UL Tx.

3. The method of claim 1, wherein a value of the pre-UL Tx gap and a value of the post-UL Tx gap are same.

4. The method of claim 1, wherein a value of the pre-UL Tx gap and a value of the post-UL Tx gap are different.

5. The method of claim 1, wherein the UL grant is received and the UL Tx is performed with half-duplex frequency-division duplexing (HD-FDD), time-division duplexing (TDD), or both.

6. The method of claim 5, wherein a respective value of each of the Gap_start and Gap_end varies or remains fixed between a HD-FDD mode and a TDD mode.

7. The method of claim 1, wherein a respective value of each of the Gap_start and Gap_end is fixed or signaled by the network.

8. The method of claim 1, wherein a respective value of each of the Gap_start and Gap_end depends on a band, frequency range, or subcarrier spacing.

9. The method of claim 1, wherein a respective value of each of the Gap_start and Gap_end depends on a category or capability of the UE.

10. The method of claim 1, wherein a respective value of each of the Gap_start and Gap_end depends on a synchronization method or a TA reporting setting.

11. The method of claim 1, wherein:
   in an event that the initial value of the TA is network-determined, the TA drift rate or function is either specific to the UE or common to a beam or cell with which the UE is associated, and
   in an event that the initial value of the TA is UE-determined, the TA drift rate or function is common to the beam or cell with which the UE is associated.

12. The method of claim 1, responsive to the initial value of the TA being network-determined, further comprising:
   updating, by the processor, the TA to provide an updated TA (TA_updated) based on the initial value of the TA and the TA drift rate or function; and
   determining, by the processor, an updated position of the Tx-Rx transition gap in time based on the TA_updated.

13. The method of claim 1, responsive to the initial value of the TA being UE-determined, further comprising:
   transmitting, by the processor, to the network a TA report indicating a value of the TA determined by the UE;
   calculating, by the processor, a used TA (TA_used), which is used in UL synchronization, based on a position of the UE and a position of the NT network node; and
   calculating, by the processor, an updated TA (TA_updated) based on the TA indicated in the TA report and the TA drift rate or function.

14. The method of claim 13, further comprising:
calculating, by the processor, a differential TA (TA_diff) based on a difference between the TA_used and the TA_updated;
determining, by the processor, whether a magnitude of the TA_diff is greater than a threshold; and
transmitting, by the processor, a TA report to the network responsive to the TA_diff being greater than the threshold.

15. The method of claim 13, further comprising:
determining, by the processor, an updated position of the Tx-Rx transition gap in time based on the TA_used and a threshold; or
determining, by the processor, an updated position of the Tx-Rx transition gap in time based on the TA_updated.

16. A method, comprising:
obtaining, by a processor of an apparatus implemented in a user equipment (UE), an initial value of a timing advance (TA); and
receiving, by the processor, from a non-terrestrial network (NTN) an indication of a TA drift rate or function,
wherein, in an event that the initial value of the TA is network-determined, the TA drift rate or function is either specific to the UE or common to a beam or cell with which the UE is associated,
wherein, in an event that the initial value of the TA is UE-determined, the TA drift rate or function is common to the beam or cell with which the UE is associated,
wherein, responsive to the initial value of the TA being UE-determined, the method further comprises:
transmitting, by the processor, to the network a TA report indicating a value of the TA determined by the UE;
calculating, by the processor, a used TA (TA used), which is used in UL synchronization, based on a position of the UE and a position of the NT network node;
calculating, by the processor, an updated TA (TA updated) based on the TA indicated in the TA report and the TA drift rate or function; and
determining, by the processor, an updated position of the Tx-Rx transition gap in time based on:
the TA used and a threshold, or
the TA updated.

17. The method of claim 16, responsive to the initial value of the TA being network-determined, further comprising:
updating, by the processor, the TA to provide an updated TA (TA_updated) based on the initial value of the TA and the TA drift rate or function; and
determining, by the processor, an updated position of the Tx-Rx transition gap in time based on the TA_updated.

18. The method of claim 16, further comprising:
calculating, by the processor, a differential TA (TA_diff) based on a difference between the TA_used and the TA_updated;
determining, by the processor, whether a magnitude of the TA_diff is greater than the threshold; and
transmitting, by the processor, a TA report to the network responsive to the TA_diff being greater than the threshold.

* * * * *